(12) United States Patent
Wilfer et al.

(10) Patent No.: US 9,085,247 B2
(45) Date of Patent: Jul. 21, 2015

(54) ADJUSTING DEVICE FOR A VEHICLE SEAT, VEHICLE SEAT, ROW OF SEATS, VEHICLE SEAT AND METHOD FOR THIS

(71) Applicant: GM GLOBAL TECHNOLOGY OPERATIONS LLC, Detroit, MI (US)

(72) Inventors: Christoph Wilfer, Mainz (DE); Michael Hoefgen-Allmann, Erfelden (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 74 days.

(21) Appl. No.: 13/782,633

(22) Filed: Mar. 1, 2013

(65) Prior Publication Data
US 2013/0328370 A1  Dec. 12, 2013

(30) Foreign Application Priority Data
Jun. 9, 2012 (DE) .......................... 10 2012 011 508

(51) Int. Cl.
| | |
|---|---|
| *B60N 2/02* | (2006.01) |
| *B60N 2/20* | (2006.01) |
| *B60N 2/06* | (2006.01) |
| *B60N 2/12* | (2006.01) |
| *B60N 2/30* | (2006.01) |

(52) U.S. Cl.
CPC *B60N 2/20* (2013.01); *B60N 2/065* (2013.01); *B60N 2/12* (2013.01); *B60N 2/305* (2013.01); *B60N 2/3011* (2013.01)

(58) Field of Classification Search
CPC ........ B60N 2/30; B60N 2/304; B60N 2/3029; B60N 2/305; B60N 2/3063
USPC ...................... 297/257, 325, 326, 329, 378.1
See application file for complete search history.

(56) References Cited

U.S. PATENT DOCUMENTS

| | | | |
|---|---|---|---|
| 5,741,046 A * | 4/1998 | Leuchtmann et al. | ... 297/378.13 |
| 5,868,450 A | 2/1999 | Hashimoto | |
| 5,871,255 A * | 2/1999 | Harland et al. | ............... 297/257 |
| 5,873,629 A | 2/1999 | Schuler | |
| 6,059,345 A | 5/2000 | Yokota | |

(Continued)

FOREIGN PATENT DOCUMENTS

| | | |
|---|---|---|
| DE | 4201829 A1 | 6/1993 |
| DE | 19641091 A1 | 4/1997 |

(Continued)

OTHER PUBLICATIONS

German Patent Office, German Search Report for Application No. 102012011508.3, dated Feb. 11, 2013.

*Primary Examiner* — Philip Gabler
(74) *Attorney, Agent, or Firm* — Ingrassia Fisher & Lorenz PC

(57) ABSTRACT

An adjusting device for a motor vehicle seat is provided. The adjusting device includes a seat track arrangement with a first track part on a motor vehicle side and with a second track part arranged displaceably to the first track part. A supporting structure capable of connecting with a seat structure is mounted pivotably on the second track part about a pivot axis of a first pivot arrangement. The supporting structure has a second pivot arrangement with a pivot joint for a backrest structure. The backrest structure is connected and/or capable of being connected with the supporting structure in a foldable manner about a folding axis on a rear side relative to the seat structure. A switching arrangement facilitates an optional pivoting about the pivot axis and/or about the folding axis.

11 Claims, 1 Drawing Sheet

(56) References Cited

U.S. PATENT DOCUMENTS

| | | |
|---|---|---|
| 6,595,588 B2 | 7/2003 | Ellerich et al. |
| 6,626,481 B2 * | 9/2003 | Kawasaki ............... 296/65.01 |
| 6,899,392 B1 | 5/2005 | Saberan et al. |
| 6,908,155 B1 | 6/2005 | Wieclawski |
| 6,964,452 B2 * | 11/2005 | Kammerer ............... 297/331 |
| 7,854,462 B2 * | 12/2010 | Scholl ................... 296/65.09 |
| 2004/0051361 A1 | 3/2004 | Rausch et al. |
| 2004/0251705 A1 | 12/2004 | Tame et al. |
| 2008/0224520 A1 | 9/2008 | Veluswamy et al. |
| 2012/0132026 A1 | 5/2012 | Ootsuka et al. |

FOREIGN PATENT DOCUMENTS

| | | |
|---|---|---|
| DE | 10109397 C1 | 10/2002 |
| DE | 20304713 U1 | 7/2004 |
| DE | 102005009040 A1 | 8/2006 |
| DE | 102007005209 A1 | 6/2008 |
| DE | 202008008312 U1 | 11/2009 |
| EP | 1854659 A1 | 11/2007 |
| FR | 2449552 A | 9/1980 |
| FR | 2886592 | 12/2006 |
| GB | 2386549 A | 9/2003 |
| JP | 2005053240 A | 3/2005 |
| WO | 2007112568 A1 | 10/2007 |

* cited by examiner

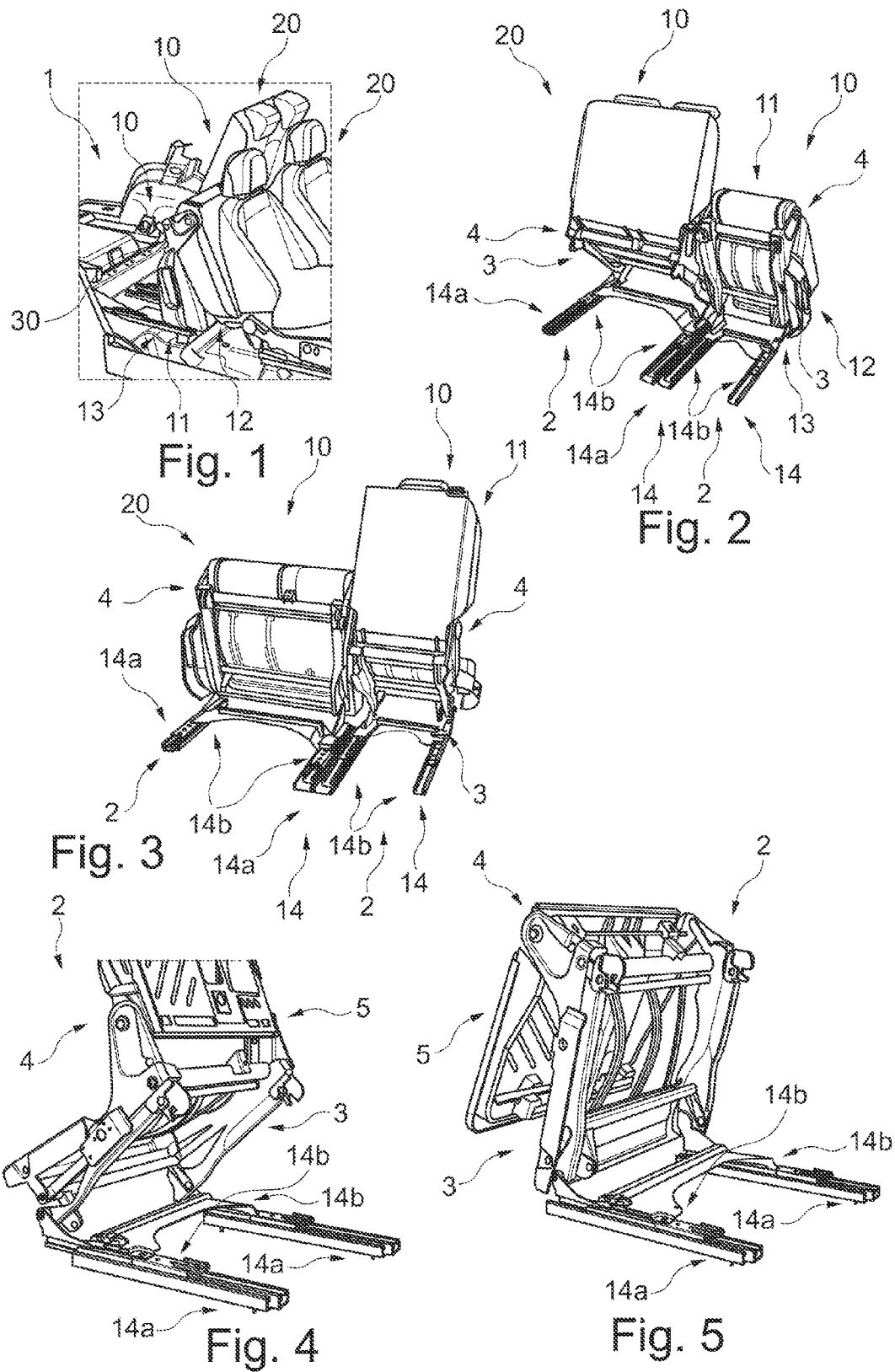

ADJUSTING DEVICE FOR A VEHICLE SEAT, VEHICLE SEAT, ROW OF SEATS, VEHICLE SEAT AND METHOD FOR THIS

CROSS-REFERENCE TO RELATED APPLICATION

This application claims priority to German Patent Application No. 10 2012 011 508.3, filed Jun. 9, 2012, which is incorporated herein by reference in its entirety.

TECHNICAL FIELD

The technical field relates to an adjusting device for a motor vehicle seat, a motor vehicle seat, a row of seats for a motor vehicle, a motor vehicle with at least one seat, and a method for adjusting a motor vehicle seat for facilitated entry and/or exit.

BACKGROUND

From DE 10 2007 00 209 A1 a motor vehicle seat is known, which is able to be transferred from a usage position into a folded position, designated as easy-entry position, wherein the vehicle seat is mounted in its front region with a rotary joint and in its rear region with a displacement means. In the easy-entry position, the vehicle seat is displaced forwards and is pivoted about the rotary joint.

From US 2008/0224520 A1 a motor vehicle with an adjusting device is known, comprising a seat track arrangement with a first track part on the motor vehicle side and a second track part arranged displaceably to the track part on the motor vehicle side, and a lever arm connected with a seat structure mounted pivotably on the second track part.

It is at least one object herein to provide an adjusting device for a motor vehicle seat, a motor vehicle seat, a row of seats, and a motor vehicle with at least one motor vehicle seat, which ensure a facilitated entry and/or exit with a high degree of ease of use.

It is another object herein to provide a method for adjusting a motor vehicle seat for a facilitated entry and/or exit. In addition, other objects, desirable features and characteristics will become apparent from the subsequent summary and detailed description, and the appended claims, taken in conjunction with the accompanying drawings and this background.

In an exemplary embodiment, an adjusting device for a motor vehicle seat includes a seat track arrangement with a first track part on the motor vehicle side and a second track part displaceably arranged to the first track part on the motor vehicle side, and a supporting structure able to be connected with a seat structure, which supporting structure is mounted on the second track part pivotably about a pivot axis of a first pivot arrangement. The supporting structure has a second pivot arrangement with a pivot joint for a backrest structure, by means of which a backrest structure is connected and/or able to be connected with the supporting structure so as to be able to be folded relative to the seat structure about a folding axis on the rear side. A switching arrangement is provided so that optionally a pivoting is able to be carried out about the pivot axis and/or about the folding axis.

The seat structure is able to be pivoted forward about the pivot axis by the first pivot arrangement for a facilitated entry and/or exit. In order to create a larger entry opening, in an embodiment, the backrest structure is able to be folded relative to the supporting structure or respectively a sitting part by the second pivot arrangement. Thereby, for example, a storage space can also be enlarged. After folding of the backrest structure onto the supporting structure or respectively the sitting part, it is possible in addition to upend the seat structure so that a large entry opening is created. The raising up for example takes place by a pivoting about the pivot axis. At the same time, however, the adjusting device takes into consideration that in many cases a quick entry and exit is desired. By pivoting the seat structure with an upright backrest structure, this is also enabled with the adjusting device. In order to prevent a pivoting about the front pivot axis, the supporting structure is able to be coupled with the seat structure or respectively with the sitting part. In order to prevent a pivoting about the front pivot axis, the supporting structure is locked with the seat structure, such as in a rear region, for example adjacent to the transition region from sitting part and backrest part, i.e. somewhat beneath the second pivot arrangement or respectively the detent fitting. In order to bring about a pivoting about the front pivot axis, the locking means, which is provided spaced apart from the front pivot axis, is released, so that the sitting part or respectively the seat structure is freed from the track arrangement in this region. The locking means is, for example, constructed as a snap closure or suchlike. The locking means has a latch element here, which is movable via an operating unit or actuating unit or respectively the switching arrangement for a locking or releasing. In an embodiment, the switching arrangement is also coupled and constructed with the detent fitting, to release or to lock this.

In an embodiment, the supporting structure is connected with the second track part at an end lying opposite the folding axis on the rear side, i.e. on a front region of the sitting part in the direction of travel. Thereby, an advantageous positioning of the pivot axis is created.

In another embodiment, a switching arrangement is provided, so that optionally a pivoting about the pivot axis and/or about the folding axis is able to be carried out. The two pivot arrangements for example are connected or respectively coupled with one another via the switching arrangement. The pivoting or folding takes place manually, automatically or semi-automatically. Both adjusting mechanisms—folding of the backrest structure or respectively of the backrest part or of the seat backrest to the seat structure and pivoting of the seat structure and pivoting of the seat structure without prior folding of the backrest part—are realized via a shared mechanism—here by a shared supporting structure. A choice of the respective mechanism takes place via a switching arrangement.

In another embodiment, the switching arrangement is coupled with an operating arrangement on the seat side. Thereby, a desired selection is able to be made immediately before a moving of the seat structure. The coupling has means so that either a pivoting about the pivot axis or a pivoting about the folding axis and the pivot axis is able to be realized. A displacing along the seat track arrangement is able to be carried out independently thereof. In an embodiment, provision is made to provide a linkage with which a second folding is only possible in a predetermined position. Thus, through the linkage, for example, a folded seat or respectively a folded seat structure is moved into the predetermined position.

In a further embodiment, in a motor vehicle seat, for example, a rear motor vehicle seat such as a rear seat or rear bench seat, with at least one adjusting possibility for adjusting the motor vehicle seat, the adjusting possibility is constructed as the adjusting device described above. The motor vehicle seat can be brought into a suitable position for entry and/or exit and/or for enlarging a storage space. For this, the motor vehicle seat or respectively its backrest part and/or its sitting part is able to be pivoted or folded. The backrest part is able to be folded relative to the sitting part via a detent fitting. The sitting part is able to be pivoted relative to the track unit via the first pivot arrangement.

In another embodiment, a row of seats includes at least two motor vehicle seats arranged adjacent to one another, wherein the motor vehicle seats are able to be adjusted differently. The division takes place in advantageous embodiments in a ratio of 60:40. The seats are for example able to be coupled into a bench seat and/or uncoupled.

In an exemplary embodiment, in a row of seats for a motor vehicle, at least two motor vehicle seats, described above, arranged adjacent to one another, are provided and the motor vehicle seats are able to be adjusted differently. Here, one motor vehicle seat is able to be pivoted for example only about a pivot axis, whereas the other, adjacent motor vehicle seat is able to be pivoted about the pivot axis and the folding axis. The respective selection takes place via a selection- or switching arrangement provided for each seat.

In another embodiment, a motor vehicle with a sitting possibility is provided, Wherein the sitting possibility is constructed as a motor vehicle seat described above and/or as a row of seats described above. In an embodiment, several vehicle seats and/or several rows of seats are provided.

In a further embodiment, a method for adjusting a motor vehicle seat for a facilitated entry and/or exit includes a pivoting at least of a part of the seat from a position of use into a folding position by an adjusting device. Before the pivoting a desired folding position is selected so that a folding position is selected from several folding positions.

In an embodiment, the adjusting device enables at least three folding positions, namely a first folding position, in which the seat structure is pivoted upright, a second folding position, in which the backrest structure is folded onto the supporting structure or respectively the sitting part is folded and the seat structure is pivoted in the folded state, and a third folding position, in which the backrest structure is folded onto the supporting structure or respectively the sitting part, but the seat structure is not pivoted. A user can thus select individually a suitable folding position. The various folding positions are able to be selected via the switching arrangement. The choice takes place before a folding and/or pivoting, for example by actuation of the operating unit and/or of the operating units. After the choice, a further adjustment, for example a further folding about another folding or pivot axis, is no longer possible or respectively not without additional actuation of for example a different operating unit or an actuation of the operating unit in another actuating direction.

In an embodiment, the pivoting includes a folding of a backrest structure relative to a seat structure or a sitting part about a folding axis of the seat structure on the rear side. Alternatively or additionally, the pivoting comprises a pivoting of the seat structure about a pivot axis of the seat structure on the front side. In an embodiment, the two pivoting or folding movements are carried out in parallel. In another embodiment, the pivoting or folding movements are carried out in succession.

In a further embodiment, in addition a displacing of the seat structure is carried out. Thereby, an entry opening can be enlarged independently of a selected folding position. In an embodiment, the displacing takes place independently of a folding position of the motor vehicle seat. In another embodiment, the displacing takes place as a function of a folding position. For example, a folding position involves a displacing or a displacing involves a folding.

BRIEF DESCRIPTION OF THE DRAWINGS

The various embodiments will hereinafter be described in conjunction with the following drawing figures, wherein like numerals denote like elements, and wherein:

FIG. 1 is a cutout of a perspective view of an interior of a motor vehicle with several rows of seats in accordance with an exemplary embodiment;

FIG. 2 is a perspective view of a row of seats with two motor vehicle seats in a first state according to FIG. 1;

FIG. 3 is a perspective view of the row of seats according to FIG. 2 in a second state;

FIG. 4 is a perspective view of an adjusting device for a vehicle seat in a first state in accordance with an exemplary embodiment; and FIG. 5 is a perspective view of the adjusting device for a vehicle seat according to FIG. 4 in a second state.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

FIG. 1 shows a cutout of a perspective view of an interior of a motor vehicle with several rows of seats 20, wherein two rows of seats 20 can be seen in the cutout. The rear row of seats 20 has two vehicle seats 10 connected with one another, which in connection with the application are jointly also designated as a motor vehicle seat or, abbreviated, as seat. The division of the row of seats 20 corresponds to a ratio of 60:40. Both motor vehicle seats 10 are respectively mounted via an associated adjusting device 2, illustrated in FIGS. 2 to 5, on a vehicle body or respectively on a supporting motor vehicle structure.

The vehicle seats 10 comprise respectively a seat structure 11 with a backrest or seat backrest 12 and a sitting part 13. The seat backrest 12 is coupled here in a foldable manner to and/or with the sitting part 13. The coupling preferably takes place via a fitting arrangement 30.

The illustrated adjusting device 2 enables three folding positions for each vehicle seat 10, namely a first folding position, in which the seat structure 11 is pivoted with upright seat backrest 12, a second folding position, in which the seat backrest 12 is folded onto the sitting part 13 or the supporting structure or seat structure 11 and the seat structure 11 is pivoted in the folded state, and a third folding position, in which the seat backrest 12 is folded onto the sitting part 13 or the seat structure 11, but the seat structure 11 is not pivoted. A user can thus select individually a suitable personalized folding position. Both in the first and also in the second folding position, the front row of seats 20 forms a stop for delimiting the movement.

In the state illustrated in FIG. 1, the right-hand vehicle seat 10 is pivoted into the first folding position. The left-hand vehicle seat 10 is pivoted into the second folding position, in order to thus create a large entry opening.

In an embodiment, the illustrated vehicle has an open storage space. In the third folding position, a storage area of the storage space is enlarged.

FIG. 2 shows the row of seats 20 with the two vehicle seats 10 and the associated adjusting devices 2 in the state according to FIG. 1. As can be seen in FIG. 2, in an embodiment, the adjusting device 2 comprises respectively two seat track arrangements 14 for each vehicle seat 10. The seat track arrangements 14 are spaced apart laterally on both sides of the vehicle seat 10 along a longitudinal direction of the vehicle on the sitting part 13 and are arranged parallel to one another. By the track arrangements 14, the vehicle seat 10 is displaceable in longitudinal direction relative to a vehicle floor (not illustrated in FIG. 2), i.e. in and contrary to a direction of travel. The track arrangements 14 have respectively a first track part 14a on the motor vehicle side and a second track part 14b on the seat side. The track part 14a on the motor vehicle side is fixed in a stationary manner on the vehicle floor. The second track part 14b on the seat side is connected at a front end with a supporting structure 3, wherein the supporting structure 3 is mounted pivotably about a pivot axis on the second track part 14b. The track parts 14a and 14b are constructed so as to be slidable relative to one another. A detailed description of the track parts 14a and 14b or respectively of the seat track arrangement 14 is dispensed with, because these components are known from the general prior art.

The supporting structure 3 has a pivot joint 4, constructed a fitting arrangement 30, for a backrest structure 4 of the backrest 12, by means of which the seat backrest 12 is able to be connected with the supporting structure 3 in a foldable manner about a folding axis on the rear side.

FIG. 3 shows the row of seats 20 with the two vehicle seats 10 and the associated adjusting devices 2 in a second state. In the state illustrated in FIG. 3, the left-hand vehicle seat 10 is pivoted into the second folding position. The right-hand vehicle seat 10 is pivoted into the first folding position, in order to quickly create a smaller entry opening.

FIGS. 4 and 5 show respectively in a perspective view the adjusting device 2 in a first folding position (FIG. 4) and respectively a second folding position (FIG. 5).

As described, the adjusting device 2 comprises two seat track arrangements 14 with respectively a first track part 14a on the motor vehicle side and a second track part 14b arranged displaceably to the first track part 14a on the motor vehicle side. The adjusting device 2 further comprises a supporting structure 3, able to be connected with the seat structure 11, which is mounted pivotably about the pivot axis on a front end of the second track part 14b. At a rear end, the supporting structure 3 has a pivot joint 4 for a backrest structure 5, by means of which the backrest structure 5 is able be connected with the supporting structure 3 in a foldable manner about a folding axis on the rear side.

As the comparison of FIGS. 4 and 5 shows, in the first folding position illustrated in FIG. 4, the motor vehicle seat 10 is displaceable as far forward as possible by means of the adjusting device 2, in order to obtain as large an entry opening as possible. In the second position, the motor vehicle seat 10, in contrast, is displaced somewhat less far, in order to prevent a collision with a front seat on folding of the backrest structure 5 or respectively of the backrest 12.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An adjusting device for a motor vehicle seat, the adjusting device comprising:
   a seat track arrangement with a first track part on a motor vehicle side and with a second track part arranged displaceably to the first track part on the motor vehicle side;
   a supporting structure capable of connecting with a seat structure and mounted pivotably on the second track part about a pivot axis of a first pivot arrangement, wherein the supporting structure has a second pivot arrangement with a pivot joint for a backrest structure, and wherein the backrest structure is connected or capable of being connected with the supporting structure in a foldable manner about a folding axis on a rear side relative to the seat structure;
   a switching arrangement that facilitates an optional pivoting about the pivot axis without folding about the folding axis, pivoting about the pivot axis and folding about the folding axis, and folding about the folding axis without pivoting about the pivot axis; and
   a linkage that enables the folding about the folding axis when the second track part is in a predetermined position.

2. The adjusting device according to claim 1, wherein the supporting structure is connected to the second track part at an end lying opposite the folding axis on the rear side.

3. The adjusting device according to claim 1, wherein the switching arrangement is coupled to an operating arrangement on a seat side.

4. A motor vehicle seat that is adjustable by an adjusting device, the adjusting device comprising:
   a seat track arrangement with a first track part on a motor vehicle side and with a second track part arranged displaceably to the first track part on the motor vehicle side;
   a supporting structure capable of connecting with a seat structure and mounted pivotably on the second track part about a pivot axis of a first pivot arrangement, wherein the supporting structure has a second pivot arrangement with a pivot joint for a backrest structure, and wherein the backrest structure is connected or capable of being connected with the supporting structure in a foldable manner about a folding axis on a rear side relative to the seat structure;
   a switching arrangement that facilitates an optional pivoting about the pivot axis without folding about the folding axis, pivoting about the pivot axis and folding about the folding axis, and folding about the folding axis without pivoting about the pivot axis; and
   a linkage that enables the folding about the folding axis when the second track part is in a predetermined position.

5. A row of seats for a motor vehicle, wherein at least two motor vehicle seats of the row are arranged adjacent to one another, each of the at least two motor vehicle seats comprising:
   a backrest structure;
   a seat structure; and
   an adjusting device, wherein the adjusting device comprises:
   a seat track arrangement with a first track part on a motor vehicle side and with a second track part arranged displaceably to the first track part on the motor vehicle side;
   a supporting structure capable of connecting with the seat structure and mounted pivotably on the second track part about a pivot axis of a first pivot arrangement, wherein the supporting structure has a second pivot arrangement with a pivot joint for the backrest structure, and wherein the backrest structure is connected or capable of being connected with the supporting structure in a foldable manner about a folding axis on a rear side relative to the seat structure;

a switching arrangement that facilitates an optional pivoting about the pivot axis without folding about the folding axis, pivoting about the pivot axis and folding about the folding axis, and folding about the folding axis without pivoting about the pivot axis, wherein the at least two motor vehicle seats are capable of being adjusted differently; and a linkage that enables the folding about the folding axis when the second track part is in a predetermined position.

6. A motor vehicle comprising:

a motor vehicle seat, and an adjusting device connected to the motor vehicle seat, the adjusting device comprising:

a seat track arrangement with a first track part on a motor vehicle side and with a second track part arranged displaceably to the first track part on the motor vehicle side;

a supporting structure capable of connecting with a seat structure and mounted pivotably on the second track part about a pivot axis of a first pivot arrangement, wherein the supporting structure has a second pivot arrangement with a pivot joint for a backrest structure, and wherein the backrest structure is connected or capable of being connected with the supporting structure in a foldable manner about a folding axis on a rear side relative to the seat structure;

a switching arrangement that facilitates an optional pivoting about the pivot axis without folding about the folding axis, pivoting about the pivot axis and folding about the folding axis, and folding about the folding axis without pivoting about the pivot axis; and a linkage that enables the folding about the folding axis when the second track part is in a predetermined position.

7. A method for adjusting a motor vehicle seat for a facilitated entry and/or exit, the method comprising the steps of:

selecting a desired folding position of the motor vehicle seat from several possible folding positions; and pivoting at least of a part of the motor vehicle seat from a position of use into the desired folding position by an adjusting device comprising:

a seat track arrangement with a first track part on a motor vehicle side and with a second track part arranged displaceably to the first track part on the motor vehicle side;

a supporting structure capable of connecting with a seat structure and mounted pivotably on the second track part about a pivot axis of a first pivot arrangement, wherein the supporting structure has a second pivot arrangement with a pivot joint for a backrest structure, and wherein the backrest structure is connected or capable of being connected with the supporting structure in a foldable manner about a folding axis on a rear side relative to the seat structure;

a switching arrangement that facilitates an optional pivoting about the pivot axis without folding about the folding axis, pivoting about the pivot axis and folding about the folding axis, and folding about the folding axis without pivoting about the pivot axis; and a linkage that enables the folding about the folding axis when the second track part is in a predetermined position.

8. The method according to claim 7, wherein the pivoting comprises a folding of the backrest structure relative to the seat structure about the folding axis of the seat structure on the rear side.

9. The method according to claim 7 or 8, wherein the pivoting comprises a pivoting of the seat structure about the pivot axis of the seat structure on the front side.

10. The method according to claim 7, further comprising displacing the seat structure.

11. The motor vehicle seat according to claim 4, wherein the motor vehicle seat is a rear motor vehicle seat.

* * * * *